Nov. 20, 1945.  H. J. HIRSCHMAN ET AL  2,389,311
BRAKE
Filed April 21, 1943  4 Sheets-Sheet 1
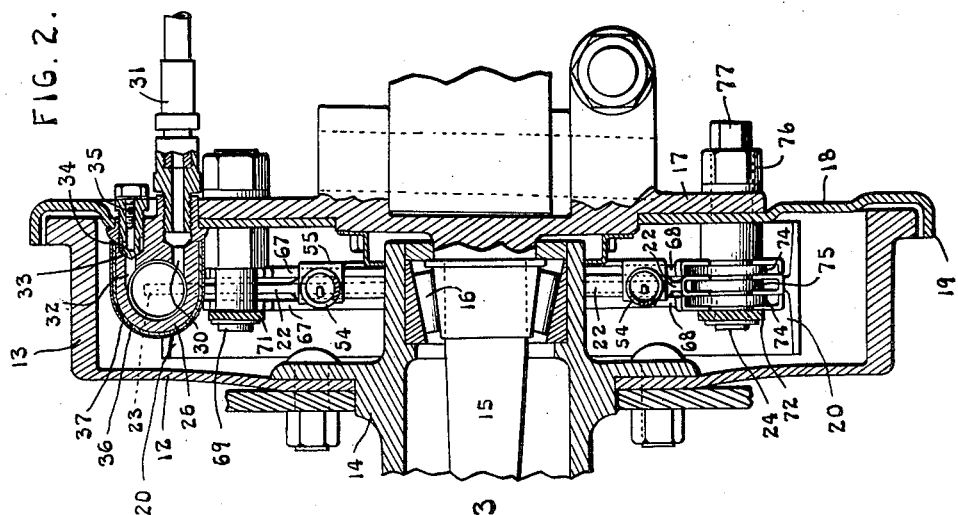
INVENTORS:
H. J. HIRSCHMAN
F. A. HIRSCHMAN
BY Albert J. McCauley
ATTORNEY.

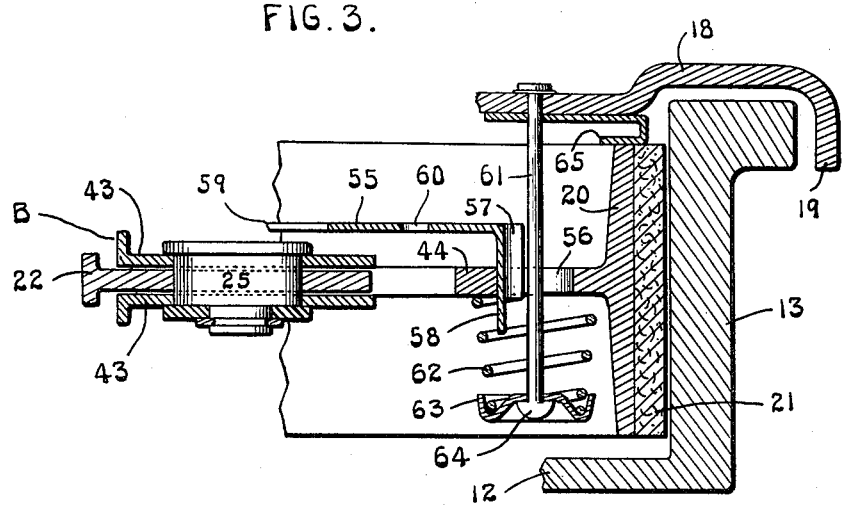
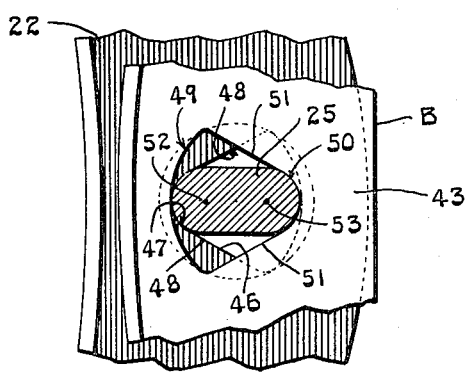
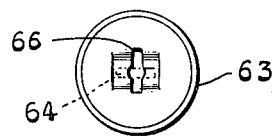
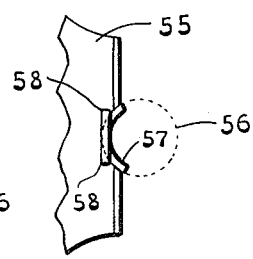
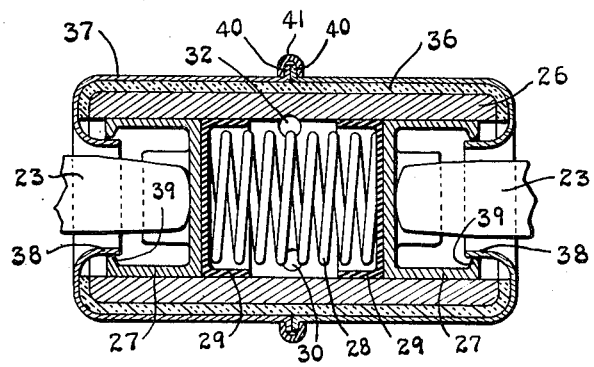

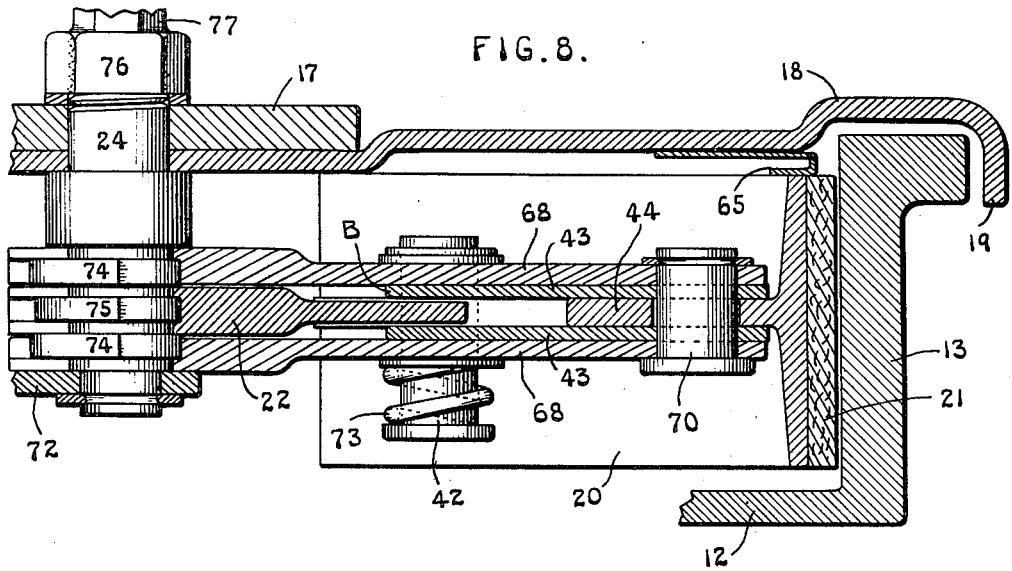
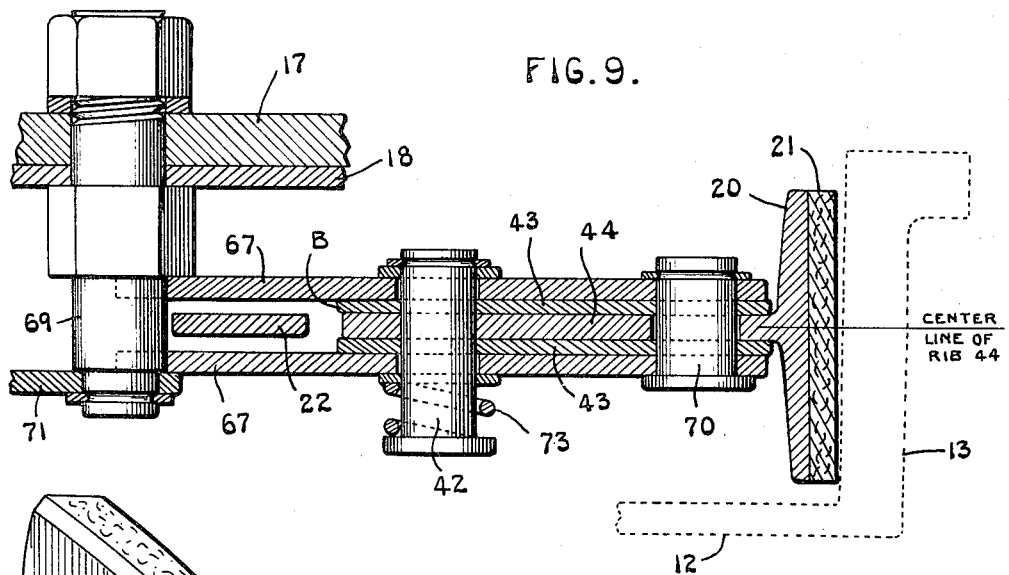
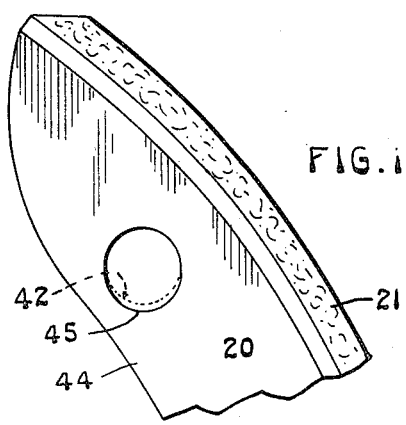

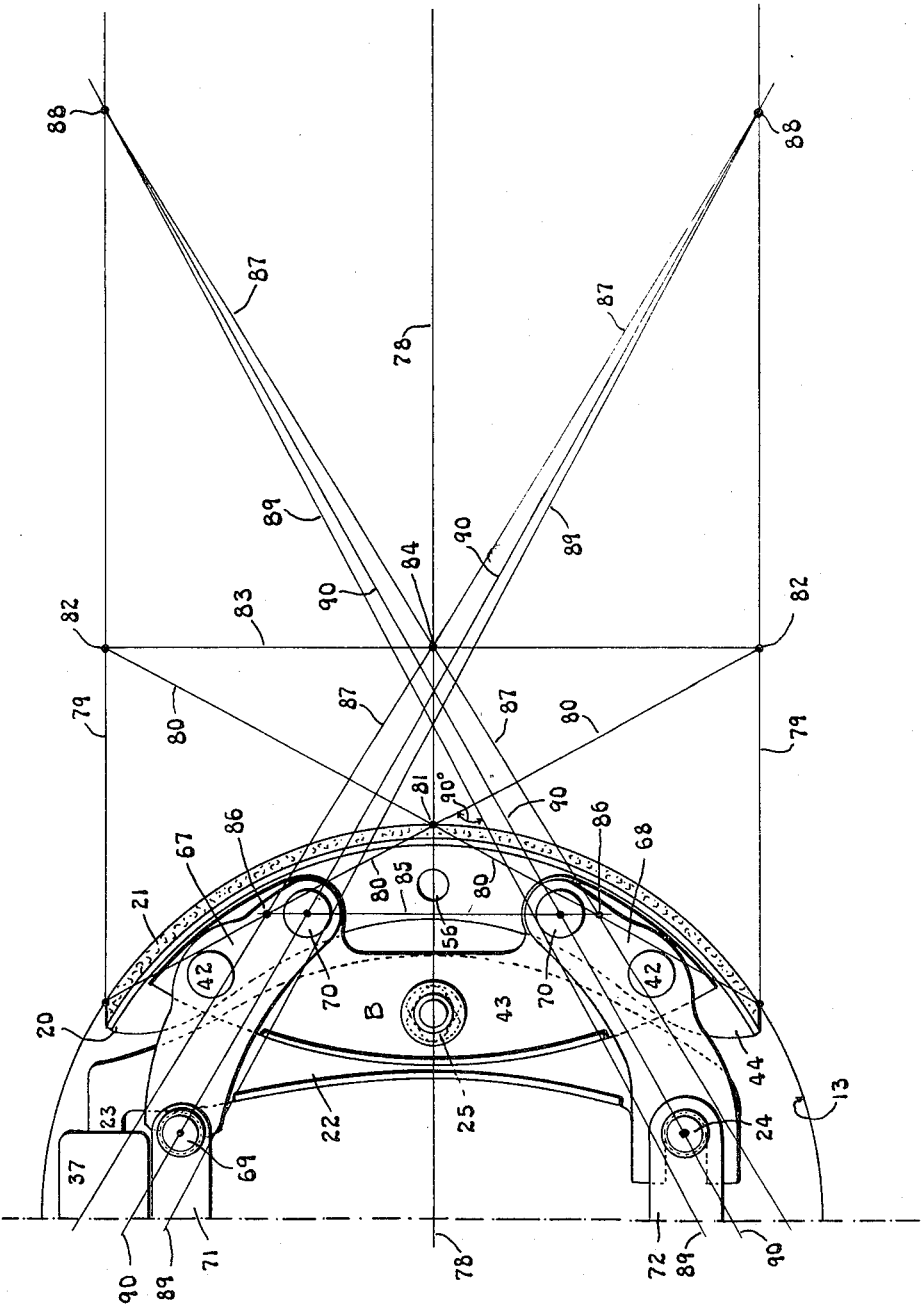

Patented Nov. 20, 1945

2,389,311

UNITED STATES PATENT OFFICE 2,389,311

BRAKE

Harry J. Hirschman and Frederick A. Hirschman, Rock Hill Village, Mo.

Application April 21, 1943, Serial No. 483,958

22 Claims. (Cl. 188—78)

This invention relates to brakes, either hydraulic or cam-actuated, for use in light or heavy vehicles. However, the invention includes features having outstanding advantages in hydraulic brakes of the internal shoe expanding type, for use in connection with heavy type vehicles such as trucks, bomber aeroplanes, tanks, etc.

A special object is to provide a brake of longer life, highly efficient, with maximum braking power and a minimum of pedal pressure and movement. To obtain the desired degree of sensitiveness and provide greater braking power and ease of operation, we have disclosed special conditions wherein the momentum of the moving vehicle is transmitted through a rotary friction member and utilized to very effectively cooperate with the braking pressure applied through a foot pedal.

A very important object of this invention is to provide a brake that will maintain its maximum braking power through varying degrees of heat developed in retarding the momentum of the vehicle.

The torque developed is controlled entirely by the amount of pedal pressure applied, without undesirable windup to take away the control. This brake is capable of stopping the heaviest vehicle without other aid such as vacuum boosters, etc., as it develops its maximum braking power within itself. In practice it has been found capable of developing several times the braking torque attained by conventional brakes with equal amount of line pressure.

By employing a unique principle of double acting fully energized brake shoes, acting simultaneously, but neither depending on the other for torque building frictional contact, we have found that it is possible to engage 240 degrees of a brake lining with the contact surface of a brake drum, thereby creating a greater degree of actual torque building contact than heretofore possible in any other construction. Furthermore, there is a highly efficient equalization of the pressure throughout this large area.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications within the scope of terms employed in the claims hereunto appended.

Fig. 1 is a vertical section through a brake drum equipped with a brake device embodying features of this invention.

Fig. 2 is a transverse vertical section taken approximately through the center of Fig. 1.

Fig. 3 is an enlarged fragmentary section on the line 3—3 in Fig. 1, showing a double pivot device, and a detachable connection between an equalizer and the brake shoe.

Fig. 4 is a detail view of a detachable spring seat shown in Fig. 3.

Fig. 5 is a detail view of the double pivot member, showing portions of a bridge and an operating member having apertures to receive this double pivot member.

Fig. 6 is a detail view of an end portion of an equalizer to be pivotally attached to a brake shoe.

Fig. 7 is a longitudinal section through a cylinder provided with a pair of oppositely disposed pistons for the transmission of pressure to the brake device.

Fig. 8 is an enlarged section taken approximately on the line 8—8 in Fig. 1.

Fig. 9 is an enlarged section taken approximately on the line 9—9 in Fig. 1.

Fig. 10 is a detail view of the upper portion of a brake shoe, showing an enlarged opening which provides for free expansion and resilient bending of the brake shoe.

Fig. 11 is a diagram intended to aid in showing suitable locations of the pivots and anchor pins for the articulating links.

To illustrate one form of the invention, we have shown a rotary brake drum including a circular web, or disk 12 and an annular friction flange 13 extending from said web 12. This web 12 may be attached to a wheel hub 14, as shown in Fig. 2, so that the brake drum will rotate with the wheel. Fig. 2 also shows an axle 15 located within the hub 14, and a roller bearing 16 between the hub and axle, but the invention is not limited to such details. The axle 15 may be provided with a fixed, or non-rotatable, brake support including an annular flange 17 and an annular web 18 extending therefrom, as shown in Fig. 2, said web 18 having a peripheral flange 19 surrounding a marginal portion of the rotary friction flange 13.

Fig. 1 illustrates a pair of oppositely disposed brake shoes 20, each having an arcuate friction member 21 adapted to engage the circular inner face of the rotary friction flange 13, and each brake shoe is provided with a set of operating devices to force its friction member 21 into contact with the rotary friction flange 13. Each brake shoe and its operating devices at one side of Fig. 1 may be duplicates of corresponding elements at the other side, so we will refer particularly to the details at the right hand side of Fig. 1, with the understanding that corresponding details appear at the other side.

The operating devices for the brake shoes include a number of unique conditions, each having a special advantage when considered alone or in combination with other specific details herein shown.

In any brake the primary operating devices are important factors, and we will now refer to a lever of the second class serving to transmit pressure to a brake shoe. By "lever of the second class" we mean a lever fulcrumed near one end and receiving energy from a source of power at its opposite end, while transmitting pressure from a point between said ends. For example, Fig. 1 shows an operating lever 22 having a driving abutment 23 at its upper end, a fulcrum carried by an anchor pin 24 at its lower end and a thrust member 25 between said ends. In a device of this kind, the ends of the operating lever may be remote from each other and located adjacent to diametrically opposite portions of the rotary friction flange 13 which surrounds said lever. This provides for a highly desirable leverage in the transmission of pressure, and the upper arm of the lever, extending from the thrust member 25 to the driving abutment 23, may be longer than the lower arm which extends from said thrust member to the fulcrum at the anchor pin 24. The pressure transmitted to said thrust member 25 may be more than twice the degree of pressure transmitted to the upper end of said lever, and this high pressure may be transmitted to the brake shoe as will be hereafter described.

In Fig. 1, the driving abutments 23 of a pair of oppositely disposed levers 22 extend into a wheel cylinder 26, so as to engage a pair of oppositely disposed pistons 27 in said cylinder. Details of this condition are more clearly shown in Fig. 7, which illustrates a compression spring 28 between packing cups 29 at the pistons 27, and an inlet port 30 for the admission of fluid under pressure between the pistons. As shown in Fig. 2, this inlet port 30 may communicate with a hose connection 31 for the transmission of fluid pressure from the usual master cylinder (not shown) to the cylinder 26. Fig. 2 also shows a vent 32 at the upper portion of the cylinder, said vent being normally closed by a tubular screw 33 having a port 34, and a second closure screw 35 removably located in said tubular screw 33.

The cylinder 26 is preferably located in a zone of high temperatures, near the friction flange 13 of the brake drum. However, as most clearly shown in Fig. 7, said cylinder is provided with a layer 36 of heat-insulating material, such as asbestos, on its outer face, and a metallic shell 37 enclosing said insulation. Aside from the insulating value of this condition, the shell 37 has extended end portions 38 projecting into opposite ends of the cylinder 26, as shown in Fig. 7, so as to hold the pistons in said cylinder when the brake is dismantled. Each piston 27 may be provided with an internal flange 39 at its outer end, located adjacent to an inturned end portion 38 of the outer shell 37, so as to provide a dust guard. This outer shell 37 may be made of two sections, as shown in Fig. 7, said sections having meeting flanges 40 embraced by a connecting member 41.

It will now be understood that the single cylinder 26 can be adequately protected from excessive heat and dirt in the brake device, and that the opposed pistons in this single cylinder can be simultaneously actuated from a source of hydraulic pressure, so as to equalize the transmission of pressure to the pair of operating levers 22.

The means for transmitting pressure from these levers includes the thrust members 25 and bridges B connected to end portions of the brake shoes by means of thrust members 42. Each bridge B may include a pair of curved bridge members 43 having end portions at opposite side faces of a rib 44 extending inwardly from a brake shoe 20, and each thrust member 42 may be in the form of a pin extending through a pair of the bridge members 43 and also through the rib 44 of the brake shoe. Each of these thrust members 42 may be closely fitted to the bridge members and rib 44. However, to provide for expansion and resilient bending of the brake shoe, each end portion of the rib 44 is preferably slotted, as shown most clearly at 45 in Fig. 10, to receive one of the thrust members 42. The thrust member can be closely fitted to opposite side walls of the slot 45, but the extended portion of the slot will provide for expansion of the brake shoe. This condition, including the thrust members 42 at extremities of slots 45 (Fig. 10) rigidly connects the bridge members 43 to opposite end portions of the brake shoe. In other words, we have shown a bridge B (43) rigidly connected to opposite end portions of a brake shoe under conditions wherein the shoe itself is separated from anchors for the brake device, while the bridge is relied upon as a support for the shoe. We will show how the bridge may be anchored at its opposite ends, so as to produce a device wherein the anchored bridge has special advantages as a support for the brake shoe. Briefly stated, the bridge B (43) is provided with suitable abutment members seated against a pair of anchor members, so as to anchor the shoe, which is quite different from an older idea of directly anchoring opposite ends of the shoe. The means for anchoring the bridge preferably includes pivotal abutment members at opposite end portions of said bridge, and these abutment members may be in the form of links 67 and 68 seated against anchor members 69 and 24 to anchor the bridge, as will be herein described.

As shown in Figures 1, 3 and 5, the operating lever 22 extends between two of the bridge members 43, and this lever (Fig. 5) has a slot 46 provided with an arcuate seat 47 and walls 48 diverging from said seat. Each bridge member 43 is likewise provided with a slot 49 having an arcuate seat 50 and walls 51 diverging from said seat, as shown in Fig. 5. The thrust member 25 is oblong in cross section, and it has oppositely disposed arcuate abutment faces contacting with said arcuate seats 47 and 50. The axes of said arcuate abutment faces are indicated at 52 and 53 in Fig. 5, said axes being separated from each other, so that the thrust member 25 may oscillate on its arcuate seats, with either axis as a center.

The thrust member 25 thus provides an extremely simple double pivot device. Attention is directed to the resultant flexibility, which allows the bridge members 43 to move either upwardly or downwardly, or in an arc of a circle about either of the axes 52 or 53. Consequently, the bridge members and brake shoe are free to adjust themselves to provide for uniform frictional contact throughout the length of the arcuate friction member 21. This free adjustment may be utilized in equalizing the distribution of energy from the operating lever to the elongated arcuate friction members 21, and also in a condition which exists when the added energizing effect of the rotary brake drum is combined with pressure from the operating levers.

Aside from the foregoing advantages of extreme flexibility, providing for conditions which result in uniform frictional contact throughout the friction surface of each arcuate member 21, the double pivot device formed by the thrust member 25 is preferably located in a plane represented by the line 3—3 in Fig. 1, midway between the ends of the arcuate friction member 21, so as to equalize, or uniformly distribute pressure from the operating lever to opposite ends of said friction member.

From another viewpoint, this simple and compact double pivot device has a number of separate and distinct advantages not found in the older ideas of using relatively long link connections pivoted to the brake shoe, so as to transmit the initial braking thrusts from a source of power to a pivotal connection near the friction surfaces. Aside from the cost of making and assembling such link connections involving separate pivot pins at opposite ends of the links, the older ideas of pivoting the links to the brake shoes has resulted in elongated links for the transmission of manual power to the shoes. The new double pivot device is simpler, stronger, less expensive, and it provides a compact arrangement of double pivots which may be located remote from the friction surfaces, thereby providing for a highly desirable efficiency in equalizing the distribution of braking forces not obtainable from the older ideas of pivoting links to the brake shoes.

Of course some advantages of the new double pivot may be obtained when it is pivoted directly to the shoe, and so far as specific details of this feature are concerned, we expect to cover such use of the double pivot. However, special advantages can be obtained by imparting the manual trusts through its pair of pivots while both pivots are separated from the body of the brake shoe as herein shown and described.

To illustrate a suitable means for retracting the brake shoes 20 from the friction face of the brake drum, we have shown in Fig. 1 a pair of contractile springs 54 at opposite sides of the center of said drum, and equalizers 55 connecting said springs to the ribs 44 of the brake shoes. Each rib 44 is provided with an aperture 56 approximately midway between the ends of the shoe. Each equalizer 55 (Figures 1, 3 and 6) includes an arcuate extension 57 pivotally seated in said aperture 56 and lugs 58 projecting from said arcuate extension to interlock the equalizer with the shoe. Each equalizer also has a pair of arms 59 diverging from its pivotal extension 57 to said pair of springs 54, and there is an opening 60 in each equalizer to receive a tool for connecting and disconnecting the arcuate extension 57 of the equalizer from its seat in the aperture 56.

Any suitable anti-rattle brake shoe guide may be used to stabilize the shoe from road shock. For example, a small wire key 61 (Fig. 3) is inserted through an aperture in the brake supporting member 18 and through the aperture 56 in the rib of a brake shoe. A small conical spring 62 is compressed between the rib 44 of the brake shoe and a cap 63 which contacts with an oblong head 64 of the key 61, thus maintaining a constant light pressure of the brake shoe against a brake shoe guide 65, shown in Fig. 3. The cap 63 may be provided with an oblong aperture 66 to detachably interlock said cap with the wire key 61, as shown in Figures 3 and 4.

Under various conditions, the friction flange 13 of the brake drum will expand and contract. For example, under severe braking service the heat developed will cause this flange to expand, and this expansion results in a tapering condition suggested by dotted lines in Fig. 9.

It has been the belief that when a brake is operating under high temperatures due to friction and when the drum is then expanded, increasing pressure on the brake shoe would keep the brake lining 21, including both ends of the lining, in full contact, and that the loss in braking power was due to the decrease in the co-efficient of friction of the brake lining, and increasing line pressure was expected to overcome this condition. However, we find this true only to a small degree, as another condition exists in the previously mentioned drum taper shown in Fig. 9. If this undesirable condition is overcome, the extremely high line pressure will be unnecessary.

Owing to the fact that there is less expansion of the annular flange 13 near the integral web or disk 12 of the brake drum than at the relatively free outer marginal portion of said flange, a high pressure condition has been previously created on the brake lining, near the disk or web side, causing the drums to score and the lining to burn at this point and thereby lose its coefficient of friction. Under these old conditions, the relatively free outer margin of the friction flange 13 is the point of greatest expansion, and the brake lining can not make a full contact due to the tapering condition of the drum.

After considerable research, we have found that by placing the rib 44 off center on the brake shoe, as shown in Fig. 9, the above condition can be eliminated. Assuming that the width of the brake shoe is 2 inches, the center of the rib 44 may be $\frac{23}{32}$" from one edge of the shoe and $1\frac{5}{32}$" from the opposite edge. This specific detail is merely for a design herein shown, which suggests a ratio suitable for other designs, but the invention is not limited to such details.

In an arrangement of this kind, the high pressure is relieved near the disk or web 12 and increased near the outer margin of the flange 13. The rib 44 of the brake shoe is nearer to the outer margin of said flange, and the pressure is applied nearer the point of greatest expansion, while the shoe is permitted to easily shift to form a right angle to the drum taper under high temperatures. This condition provides for uniform frictional contact, and uniform wear of the brake lining formed by the arcuate friction member 21.

The actuating force is applied at the center of the bridge B, which also receives the braking torque, and pressure is transmitted through thrust connections 42 at opposite end portions of the bridge and brake shoes, causing the shoes to flex or resiliently bend under high torque pressures, so as to conform to the curvature of the surrounding friction flange 13.

Attention is now directed to articulating links including an upper pair of links 67 and a lower pair of links 68. Each upper link 67 has a bifurcated end seated against a fixed anchor pin 69, and a pivot pin 70 at its opposite end extending through a relatively large hole in the shoe rib 44, as shown in Fig. 9. Each lower link 68 is likewise connected to a pivot pin 70, as shown in Figures 1 and 8. A fixed link 71 connects the upper anchor pins 69, while a similar link 72 connects the lower anchor pins 24. The pairs of articulating links 67 and 68 diverge from pivots 70 at the brake shoes to the anchor pins 24 and 69, and the links of each pair are located at opposite sides of bridge members 43.

The pivots 70 are located at separated points equally spaced from the plane 3—3 in Fig. 1 which lies midway between the ends of the brake shoe. The thrust pins 42 extend through relatively large openings in the links 67 and 68, and a compression spring 73 may be associated with each pin 42, as shown in Figures 8 and 9, so as to force the links into frictional engagement with the bridge members 43, at the same time forcing said bridge members into frictional contact with the rib 44 of the brake shoe. The spring compression is great enough to prevent accidental displacement of the brake shoe due to road shocks.

The bifurcated ends of the lower links 68 embrace and pivotally engage cams 74 carried by the lower anchor pins 24, as shown in Figures 1, 2 and 8, while the bifurcated end of the operating lever 22 embraces and pivotally engages a cam 75 located between the cams 74. The intermediate cam 75 provides a fulcrum for the lever 22, while the outer cams 74 form pivots for the lower ends of the articulating links 68. The anchor pin 24 is secured by a nut 76 shown in Figures 2 and 8, and said pin 24 has a non-circular extension 77 which may be engaged by a wrench to adjust the cams 74 and 75 when the nut 76 is loosened.

This rotary adjustment will impart a simultaneous movement to the cams 74 and 75, while imparting longitudinal movements to the articulating links 68 which shift the brake shoe toward the friction flange 13. However, the middle cam 75 contacts with the lower end of the operating lever 22 and the displacement of this cam is less than that of the outer cams. This differential in the cam displacement enables the brake shoes to be adjusted to compensate for wear at their friction members 21, without disturbing the piston arrangement at the upper end of the operating lever 22, and without displacement of liquid in the reservoir of the master cylinder. The bifurcated lower ends of the operating lever 22 and articulating links 68 are shown most clearly in Figures 1, 2 and 8. Attention is directed to the fulcrum end of said operating lever 22 comprising a bifurcated extension with internal abutment faces, approximately parallel with each other and located at opposite sides of an anchor pin 24, so as to prevent substantial longitudinal displacement of the operating lever 22 in response to adjustments of the fulcrum cam 75. This condition prevents material displacement of the driving member 23 at the top of said lever 22 in response to adjustments of the fulcrum cam 75. It also prevents material displacement of the intermediate thrust member 25 in response to such adjustments of the fulcrum cam 75, while also preventing objectionable longitudinal displacement of the bridge members 43 and brake shoe 20. A similar condition appears at the lower ends of the articulating links 68 where the bifurcated extensions are provided with approximately parallel internal guiding abutments at opposite sides of an anchor pin 24. This anchor pin 24 can be readily adjusted around its fixed axis, so as to adjust the brake shoe toward the rotary friction member, without imparting substantial longitudinal movement to the long operating lever 22, and without objectionably displacing the articulating links 68. Consequently, the carefully predetermined conditions for operation and energization will be maintained, regardless of adjustments to compensate for decreasing thickness of the brake lining.

Aside from all of the foregoing details, important features appear in the arrangement of articulating links 67 and 68 which provides for unique braking energization of the friction elements when the rotary friction member 13 turns in either direction. When the brake drum rotates in either direction, there is an actuating force applied at the center of the bridged brake shoe, through the pivot device 25 in a plane midway between the ends of the shoe, and there is the drum rotation which has a tendency to carry the shoe in a circular path with the drum. It is obvious that the actuating force applied to the center of the bridged brake shoe is converted into frictional energy, and with any increase in pressure there will be a greater tendency to carry the brake shoe in the circular course of the drum. Assuming that the drum is turning in a clockwise direction, the frictional forces will tend to turn the shoe at the right hand side of Fig. 1 on its lower pivot 70 and have a high leverage at the upper end of the shoe, tending to force it outwardly against the friction surface of the drum, while tending to retract the lower end of the shoe below the lower pivot 70 connected to the lower articulating link 68. However, this lower link is free to move on its anchor pin 24, thereby imparting an outward thrust which results in an equalized pressure at the lower end of the shoe.

In other words, the arrangement of articulating links 67 and 68 as herein disclosed, provides for an almost perfect co-ordination between the primary actuating forces centrally applied to the bridged brake shoes and the rotary forces from the brake drum to obtain the maximum advantages of these combined forces.

Study of these forces has led to a plan for locating the centers of the pivots for the articulating links 67 and 68 at points which enable said links to most effectively perform their functions. Fig. 11 is a diagram wherein the arc of the brake lining 21 is 120 degrees of a circle. A horizontal line 78 indicates the center line of the force transmitted from the central thrust member 25 to the bridged brake shoe 20, while the top and bottom horizontal lines 79 indicate lines of thrust at the top and bottom of the brake lining 21. The lines 79 are parallel with each other, because the thrust from the member 25 is applied in a line midway between the ends of the brake lining, and the thrust member 25 provides a flexible connection through which the pressure is uniformly distributed throughout the length of the brake lining.

However, we also have the rotary forces due to frictional contact between the rotary brake drum and the brake lining 21, tending to carry the anchored brake shoe in a circular path with the rotating drum. An object is to locate the pivots of the articulating links 67 and 68 in predetermined lines, conforming to a plan wherein rotary motion is utilized to maintain a substantially uniform pressure throughout the friction face of the brake shoe, without locking the shoe to the drum, and without producing an undesirable "grabby" condition at the brake.

To diagrammatically illustrate this plan, Fig. 11 includes lines 80 drawn from the extreme ends of the friction face of the brake lining 21 and extending through a point 81 midway between the ends of said brake lining. These lines 80 are chords of the arcs at the upper and lower halves of the brake lining 21, and they are continued to points 82 on the horizontal lines 79. A vertical line 83 is drawn from one of these points 82, through a point 84 on the horizontal line 78, and thence to the other point 82. Another vertical line 85 is drawn through points 86 midway between the ends of the chords formed by the lines 80.

Fig. 11 also includes oppositely inclined lines 87 extending from the points 86 and thence through a point of intersection at 84, to points 88 on the upper and lower horizontal lines 79. These inclined lines 87 are at an angle of more than 90 degrees from the lines 80. However, lines 89 are drawn from the points 88 at an angle of 90 degrees to the lines 80.

In our study of the specific device shown in Fig. 11, we found that the axes of the pivots for the links 67 and 68 can be most favorably located in lines 90 between the lines 87 and 89, while locating the axes of pivots 70 at points where the vertical line 85 intersects said lines 90. More specifically stated, the axes of the pivots for the links 67 and 68 are preferably in diverging lines at an angle of more than 90 degrees and less than 94 degrees from the chords 80 of arcs between the ends and the middle of the friction face of the friction lining 21.

These details are intended as guides for an engineer in the design of a device as shown by Fig. 11, but the scope of the patent extends to variations and modifications described by the claims hereunto appended.

We claim:

1. A brake device comprising a rotary member having an internal friction face, a brake shoe provided with an arcuate friction member adapted to engage said internal friction face, and operating means comprising a bridge connected to said brake shoe, an operating member, a pivotal thrust member through which pressure is transmitted from said operating member to said bridge, anchor pins for the brake shoe, and articulating links connecting said bridge to the anchor pins.

2. A brake device comprising a rotary brake drum having an internal friction face, a brake shoe provided with an arcuate friction member adapted to engage said internal friction face, operating means including an operating lever surrounded by said internal friction face, a pair of bridge members for the transmission of pressure from said operating lever, the brake shoe being provided with a rib located between the bridge members, a pair of thrust members connecting end portions of said bridge members to said rib of the brake shoe, a pivotally mounted thrust member through which pressure is transmitted from said lever to said pair of bridge members, said pivotally mounted thrust member being operatively engaged with portions of said lever and bridge members in a plane approximately midway between the ends of said arcuate friction member, so as to equalize the transmission of power from said pivotally mounted thrust member to said ends of the arcuate friction member, anchor pins for the brake shoe, and articulating links connecting said bridge members to said anchor pins.

3. A brake device comprising a rotary brake drum having an internal friction face, a brake shoe provided with an arcuate friction member adapted to engage said internal friction face, operating means including an operating lever surrounded by said internal friction face, a pair of bridge members for the transmission of pressure from said operating lever, the brake shoe being provided with a rib located between the bridge members, a pair of thrust members connecting end portions of said bridge members to said rib of the brake shoe, anchor pins for the brake shoe, articulating links connecting said bridge members to said anchor pins, and a pivotally mounted thrust member through which pressure is transmitted from said lever to said pair of bridge members, said pivotally mounted thrust member being operatively engaged with portions of said lever and bridge members in a plane approximately midway between the ends of said arcuate friction member, so as to equalize the transmission of power from said pivotally mounted thrust member to said ends of the arcuate friction member, the connections for said articulating links including pins connecting said links to the bridge members, the rib of said shoe having relatively large openings to receive said pins, and said rib being slotted to receive said pair of thrust members, thereby providing for expansion of the brake shoe relative to said bridge members.

4. A brake device comprising a rotary brake drum having an internal friction face, a brake shoe provided with an arcuate friction member adapted to engage said internal friction face, operating means including an operating lever surrounded by said internal friction face, a pair of bridge members for the transmission of pressure from said operating lever, the brake shoe being provided with a rib located between the bridge members, a pair of thrust members connecting end portions of said bridge members to said rib of the brake shoe, a pivotally mounted thrust member through which pressure is transmitted from said lever to said pair of bridge members, said pivotally mounted thrust member being operatively engaged with portions of said lever and bridge members in a plane approximately midway between the ends of said arcuate friction member, so as to equalize the transmission of power from said pivotally mounted thrust member to said ends of the arcuate friction member, and springs associated with said pair of thrust members to force the bridge members into frictional engagement with the rib of the brake shoe.

5. A brake device comprising a rotary brake drum including a circular flange having an internal friction face, a brake shoe provided with an arcuate friction member adapted to engage said internal friction face, an operating member having a slot provided with an arcuate seat and walls diverging from said seat, a bridge connected to said brake shoe, said bridge having a slot provided with an arcuate seat and walls diverging from said seat, and a double pivot member located in said slots to transmit pressure from said operating member to said brake shoe, said double pivot member having oppositely disposed arcuate abutment faces contacting with said arcuate seats, the axes of said arcuate abutment faces being separated, so that the double pivot member may oscillate on said seats with either axis as a center, and said double pivot member being in a plane approximately midway between the ends of said arcuate friction member, so as to equalize the transmission of pressure from the double pivot member to said ends of the arcuate friction member.

6. In a brake device wherein high temperatures result in expansion of friction members, a rotary brake drum including a web and an annular friction flange extending from said web, said flange being provided with a marginal portion formed integral with said web and a relatively free marginal portion separated from said web, said annular friction flange being expansible to a tapering condition wherein the largest diameter appears at said relatively free marginal portion, a brake shoe provided with a friction member adapted to engage the inner face of said annular flange, said brake shoe having a rib offset toward said relatively free marginal portion of said annular friction flange, and operating means connected to said offset rib, so as to transmit the braking pressure to said friction flange in a line offset from the longitudinal center line of the brake shoe, said operating means including laterally yieldable connections permitting the brake shoe to move to a tilted braking position wherein its friction member conforms to the expanded tapering condition of said annular friction flange.

7. In a brake device wherein high temperatures result in expansion of friction members, a rotary brake drum including a circular web and an annular friction flange extending from said web, said flange being provided with a marginal portion formed integral with said web and a relatively free marginal portion separated from said web, said annular friction flange being expansible to a tapering condition wherein the largest diameter appears at said relatively free marginal portion, a brake shoe provided with a friction member adapted to engage the inner face of said annular flange, said brake shoe having a rib offset toward said relatively free marginal portion of said annular friction flange, and operating means connected to said offset rib, so as to transmit the braking pressure to said friction flange in a line offset from the longitudinal center line of the brake shoe, said operating means including a bridge connected to opposite end portions of said offset rib, so as to produce thrusts tending to resiliently bend the brake shoe to the shape of said annular friction flange, anchor members, and links yieldably connecting said bridge and brake shoe to said anchor members, said brake shoe being movable to an operative braking position wherein its friction member conforms approximately to the expanded tapering condition of said annular friction flange.

8. In a brake device having a rotary member provided with an internal friction face, and a brake shoe having an arcuate friction member adapted to engage said internal friction face, operating means to force said brake shoe toward said internal friction face, a pair of contractile springs, and an equalizer connecting said springs to said brake shoe, said equalizer being connected to said brake shoe at a point approximately midway between the ends of the shoe and provided with diverging extensions connected to said pair of springs.

9. A brake device comprising a rotary brake drum including a circular flange having an internal friction face, and a pair of brake shoes having arcuate friction members adapted to engage oppositely disposed portions of said friction face, operating means to force said brake shoes toward said friction face, a pair of contractile springs at opposite sides of the center of said drum, and equalizers connecting said springs to said brake shoes, each brake shoe having a rib provided with an aperture approximately midway between the ends of the shoe, each equalizer being provided with an arcuate extension pivotally seated in said aperture, and lugs projecting from said arcuate extension to interlock the equalizer with the shoe, each equalizer also having a pair of arms diverging from the pivotal extension to said pair of springs, and there being an opening in each equalizer to receive a tool for connecting and disconnecting the arcuate extension of the equalizer.

10. A brake device comprising a rotary friction member having an internal friction face, a brake shoe provided with an arcuate friction member adapted to engage said friction face, a brake support including anchor members, a pair of articulating links diverging from said brake shoe to said anchor members, said links being pivoted to the brake shoe and anchor members, an operating member, a pivotal thrust member through which pressure is transmitted from said operating member to said brake shoe, said pivotal thrust member being separated from said brake shoe and in a plane approximately midway between the ends of said arcuate friction member so as to equalize the transmission of pressure to said ends of the friction member, and a bridge connecting said pivotal thrust member to said brake shoe.

11. A brake device comprising a rotary brake drum having an internal friction face, a brake shoe provided with an arcuate friction member to engage said internal friction face, a brake support including a pair of anchor pins, an operating lever of the second class having a driving abutment near one end, the opposite end of said lever being pivotally seated at one of said anchor pins, a bridge for the transmission of pressure from said lever to said brake shoe, a thrust member pivotally seated within intermediate portions of the lever and bridge to provide for the transmission of pressure from the lever to the bridge, said thrust member being separated from the brake shoe and located in a plane approximately midway between the ends of said arcuate friction member, a pair of thrust members connecting said bridge to the brake shoe, articulating links diverging from said brake shoe to said anchor pins, and pivots connecting ends of said links to the bridge at separated points equally spaced from said plane, the opposite ends of said links being pivotally connected to said anchor pins.

12. A brake device comprising a rotary brake drum having an internal friction face, a brake shoe provided with an arcuate friction member to engage said internal friction face, a brake support including a pair of anchor pins, an operating lever of the second class having a driving abutment near one end, the opposite end of said lever being pivotally seated at one of said anchor pins, a bridge for the transmission of pressure from said lever to said brake shoe, a thrust member pivotally seated within intermediate portions of the lever and bridge to provide for the transmission of pressure from the lever to the bridge, said thrust member being separated from the brake shoe and located in a plane approximately midway between the ends of said arcuate friction member, a pair of thrust members connecting said bridge to the brake shoe, articulating links diverging from said brake shoe to said anchor pins, pivots connecting ends of said links to the bridge at separated points equally spaced from said plane, the opposite ends of said links being pivotally connected to said anchor pins, and springs associated with said pair of thrust members to force said brake shoe and articulating links into frictional contact with said bridge.

13. A brake device comprising a rotary brake drum having an internal friction face, a brake shoe provided with a reinforcing rib, an arcuate friction member carried by said brake shoe to engage said internal friction face, a brake support including a pair of anchor pins, an operating lever of the second class having a driving abutment near one end and a fulcrum near its opposite end, said fulcrum being in the form of a cam carried by one of said anchor pins, and the lever being provided with a bifurcated extension embracing and contacting with said cam, a cylinder containing a fluid-actuated piston cooperating with the driving abutment of said lever to pivotally move the lever on said fulcrum, a pair of bridge members for the transmission of pressure from said lever to said brake shoe, the rib of the brake shoe being located between end portions of said bridge members, said lever having an intermediate portion between intermediate portions of said bridge members, a thrust member surrounded by and pivotally seated within said intermediate portions of the lever and bridge members to provide for the transmission of pressure from the lever to the bridge members, said thrust member being separated from the brake shoe and located in a plane approximately midway between the ends of said arcuate friction member, a pair of thrust members connecting end portions of said bridge members to said rib of the brake shoe at points equally separated from said plane between the ends of said arcuate friction member, pairs of articulating links diverging from said brake shoe to said anchor pins, the links of each pair being at opposite sides of said bridge members, pivots extending through said rib and connecting ends of said pairs of links to the bridge members at separated points equally spaced from said plane, the opposite ends of one pair of said links being pivotally connected to one of said anchor pins, the other pair of links having bifurcated end portions embracing the other anchor pin, and cams carried by the last mentioned anchor pin at opposite sides of the first mentioned cam to form pivotal seats for the last mentioned links, said last mentioned anchor pin being rotatable to adjust the brake shoe toward said internal friction face, and the displacement of the first mentioned cam being less than that of the other cams.

14. A brake device comprising a rotary friction member having an internal friction face, a brake shoe provided with an arcuate friction member adapted to engage said friction face, a brake support including anchor members, a pair of articulating links diverging from said brake shoe to said anchor members, said links being pivoted to the brake shoe and anchor members, an operating member, and a pivotal thrust member through which pressure is transmitted from said operating member to said brake shoe, said pivotal thrust member being in a plane approximately midway between the ends of said arcuate friction member so as to equalize the transmission of pressure to said ends of the friction member, and the axes of the pivots of said links being in diverging lines at an angle of more than 90 degrees and less than 94 degrees from chords of arcs between the ends and the middle of the friction face of said friction member.

15. A brake device comprising a rotary member having a circular friction face, a brake shoe provided with a curved friction member adapted to engage said circular friction face, an operating member for said brake shoe and a double pivot member through which pressure is transmitted from said operating member to actuate said brake shoe, said double pivot member being in the form of a bar having oppositely disposed arcuate side faces surrounded by said operating member, the brake shoe and operating member being provided with operating abutments in the form of arcuate seats contacting with the arcuate side faces of said bar, said arcuate side faces of the surrounded bar being in a plane approximately midway between the ends of said curved friction member, so as to equalize the transmission of pressure from said bar to said ends of the curved friction member, and the axes of said arcuate faces being separated, so that the bar may be oscillated on said seats with either axis as a center.

16. A brake device comprising a rotary brake drum including a circular flange having an internal friction face, a brake shoe provided with an arcuate friction member adapted to engage said internal friction face, an operating member having an opening provided with an arcuate seat and walls extending from said seat, a bridge connected to said brake shoe, said bridge having an opening provided with an arcuate seat and walls extending from said seat, and a double pivot member comprising an oblong bar located within and surrounded by the walls of said openings to transmit braking pressure from said operating member to said bridge, said double pivot member having oppositely disposed arcuate side faces contacting with said arcuate seats, the axes of said arcuate side faces being separated, so that the double pivot member may oscillate on said seats with either axis as a center, and said double pivot member being in a plane approximately midway between the ends of said arcuate friction member, so as to equalize the transmission of pressure from the double pivot member to said ends of the arcuate friction member.

17. A brake device comprising a rotary friction member having an internal friction face, a brake shoe provided with a friction member adapted to engage said friction face, an operating lever of the second class surrounded by said internal friction face, said lever having a driving member near one end and a fulcrum near its opposite end, and a thrust device arranged to transmit power from an intermediate portion of said operating lever to said brake shoe, said fulcrum comprising an anchor pin provided with a fulcrum cam contacting with the operating lever, said anchor pin being adjustable around a fixed axis to locate the fulcrum cam in different positions, thereby adjusting said brake shoe toward said friction face, the fulcrum end of said operating lever having approximately parallel guiding abutments at opposite sides of said anchor pin to prevent substantial longitudinal displacement of said lever in response to adjustments of said fulcrum cam.

18. A brake device comprising a rotary friction member having an internal friction face, a brake shoe provided with a friction member adapted to engage said friction face, an operating lever of the second class surrounded by said internal friction face, said lever having a driving member near one end and a fulcrum near its opposite end, and a thrust device arranged to tarnsmit power from an intermediate portion of said operating lever to said brake shoe, said fulcrum comprising an anchor pin provided with an extended fulcrum cam contacting with the fulcrum seat of said operating lever, said anchor pin being adjustable around a fixed axis to locate the fulcrum cam in different positions, thereby adjusting said brake shoe toward said friction face, the fulcrum end of said operating lever comprising a bifurcated extension with internal abutment faces at opposite sides of said anchor pin to prevent substantial longitudinal displacement of said operating lever in response to adjustments of said fulcrum cam, thereby preventing material displacement of said driving member and thrust device in response to adjustments of said fulcrum.

19. A brake device comprising a rotary member having an internal friction face, a brake shoe provided with an arcuate friction member adapted to engage said internal friction face, and operating means comprising a bridge connected to said brake shoe, an operating lever of the second class having a driving member near one end and a fulcrum near its opposite end, a pivotal thrust member through which pressure is transmitted from said operating lever to said bridge, articulating links connected to said bridge, said fulcrum comprising an anchor pin provided with cams contacting with said links and a fulcrum cam contacting with said operating lever, said anchor pin being adjustable around a fixed axis to simultaneously adjust said cams, the fulcrum end of said operating lever being provided with approximately parallel guiding abutments at opposite sides of said anchor pin to prevent substantial longitudinal displacement of said lever, and said links being provided with approximately parallel guiding abutments at opposite sides of said anchor pin.

20. A brake device comprising a rotary friction member having an internal friction face, a brake shoe provided with an arcuate friction member adapted to engage said friction face, a pair of anchor members separated from said brake shoe, a bridge cooperable with said anchor members to anchor the separated brake shoe, said bridge being rigidly connected to opposite end portions of the brake shoe and provided with a pair of pivotal abutment members pivotally seated against said pair of anchor members, so as to yieldably anchor said rigidly connected bridge, and means for transmitting braking pressure to the anchored bridge at a point approximately midway between said anchor members.

21. A brake device comprising a rotary friction member having an internal friction face, a brake shoe provided with an arcuate friction member adapted to engage said friction face, a pair of anchor members separated from said brake shoe, a bridge cooperable with said anchor members to anchor the separated brake shoe, said bridge being rigidly connected to opposite end portions of the brake shoe and provided with a pair of pivotal abutment members pivotally seated against said pair of anchor members, so as to yieldably anchor said rigidly connected bridge, and means for transmitting braking pressure to the anchored bridge at a point approximately midway between said anchor members, the rigid connections at opposite end portions of the brake shoe including thrust members at extremities of slots permitting expansion of the brake shoe, while normally preventing longitudinal displacement of the shoe relative to the anchored bridge.

22. A brake device comprising a rotary friction member having an internal friction face, a brake shoe provided with an arcuate friction member adapted to engage said friction face, a pair of anchor members located adjacent to but separated from end portions of said brake shoe, a bridge cooperable with said anchor members to anchor the separated brake shoe, said bridge being provided with a pair of abutment members seated against said pair of anchor members, a pair of thrust devices rigidly connecting end portions of said brake shoe to end portions of the anchored bridge, so as to normally prevent longitudinal displacement of the shoe relative to the bridge, each of the rigid connections formed by said thrust devices including a thrust member seated in one end of a slot to normally prevent said longitudinal displacement, while allowing the brake shoe to expand in response to high temperatures, and means for transmitting braking forces to said anchored bridge.

HARRY J. HIRSCHMAN.
FREDERICK A. HIRSCHMAN.